Patented Aug. 18, 1925.

1,549,822

UNITED STATES PATENT OFFICE.

HERMANN WAGNER, OF HOCHST-ON-THE-MAIN, GERMANY, ASSIGNOR, BY MESNE ASSIGNMENTS, TO GRASSELLI DYESTUFF CORPORATION, OF NEW YORK, N. Y., A CORPORATION OF DELAWARE.

AZO DYESTUFFS AND PROCESS OF MAKING SAME.

No Drawing.     Application filed February 12, 1923.  Serial No. 618,709.

*To all whom it may concern:*

Be it known that I, HERMANN WAGNER, a citizen of Germany, residing at Hochst-on-the-Main, Germany, have invented certain new and useful Improvements in Azo Dyestuffs and Processes of Making Same, of which the following is a specification.

In my U. S. patent application Ser. No. 544,613—filed March 17, 1922 has been described a process of preparing particularly fast azo dyestuffs consisting in the combination of any diazo components with 2.3-hydroxynaphthoic acid-o-toluidides.

In further developing the inventive idea set forth in the said application, of increasing the fastness of the dyestuffs in question by introducing methyl groups in ortho-position to the imide group of the 2.3-hydroxynaphthoic acid arylide, I have found that in an analogous manner there may also be obtained products of excellent properties, particularly of very greatly increased fastness to kier-boiling, by introducing alkyloxy-, aryloxy-, and aralkyloxy groups into the same ortho-position. Besides the good qualities of the products obtainable according to said U. S. application Ser. No. 544,613—these bodies also possess a greater fastness to light than the products of the said application.

In all of these combinations of diazo compounds with o-alkyloxy, o-aryloxy-, or o-aralkyloxyanilides of the 2.3-hydroxynaphthoic acid, those dyestuffs which are halogen-substituted in the diazo component or in the coupling component, and particularly, those which are halogen-substituted in both components, are distinguished by their particularly great fastness to kier-boiling, which fastness, especially with those combinations which are halogenated on both sides, is greater than has hitherto been observed with azo dyestuffs.

By diazo component is meant the diazotized amine which is combined with another component called the coupling component in the production of the azo dyestuff.

The new dyestuffs have the general formula:

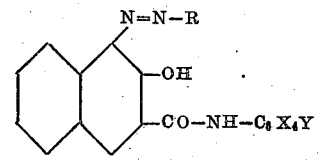

wherein R stands for any residue, X for hydrogen, halogen or any substituent, Y for an alkyloxy, aryloxy or aralkyloxy group in ortho position to the nitrogen.

The azo dyestuffs which can be obtained by combining any diazo compounds with the 2.3 hydroxynaphthoic acid anilide of the formula:

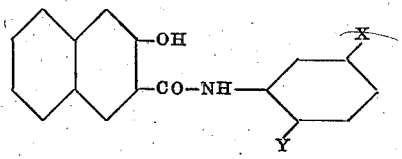

wherein X stands for halogen and Y for an alkyloxy, aryloxy or aralkyloxy group, have proven to be particularly valuable dyestuffs.

The combination of the components may, as in the case of said U. S. application Ser. No. 544,613, be effectuated either in an aqueous solution, in which case pigment dyestuffs are obtained, or the preparation of these pigments may be carried out on the fibre, whereby dyeings of the above described fastness are obtained.

*Examples.*

(1.) The material is padded with a solution of:

20 gr. of 2.3 hydroxynaptholic-acid-o-anisidide
60 gr. of caustic soda solution 22° Bé.
20 gr. of para soap P. N.

made up to 1 litre.

It is then dried and printed with the following colour:

```
15,2 gr. of 6-nitro-2-toluidine
200  ccm. of water
 24  ccm. of hydrochloric acid of 22° Bé. specific gravity, mix well
      to a paste, cool with
150  gr. of ice, then add
  8  gr. of sodium nitrite dissolved in
 50  ccm. of water
550  gr. of tragacanth (60 : 1000) and to this add before use
 20  gr. sodium acetate.
―――
1 kg.
```

(2.) The yarn is impregnated with the following preparation:

```
12,7 gr. of 2.3 hydroxynaphthoic acid-o-anisidide
 20  ccm. of caustic soda solution 34° Bé.
 30  ccm. of sodium-Turkey-red oil 50%
500  ccm. of hot water
      the whole made up with cold water to
―――
1 litre.
```

The impregnated yarn is wrung out and dyed with the following diazo solution:—

```
14,1 gr. of 5-chloro-o-toluidine are dissolved with
 24  ccm. of hydrochloric acid of 22° Bé. and
200  ccm. of boiling water, then cooled by adding
150  gr. of ice. To this is added while stirring a solution of
  8  gr. of nitrite in
 50  ccm. of water.
```

The solution is made up to 4 litres to which are added 20 gr. sodium acetate, before using it.

After dyeing, the material is well wrung out, washed and soaped.

(3.) The material is padded with a solution of:

```
20 gr. of 2.3 hydroxynaphthoic acid-o-anisidide
60 gr. of caustic soda solution 22° Bé.
20 gr. of para soap P. N.
―――
made up to 1 litre.
```

It is then dried and printed with the following colour:

```
15,7 gr. of p-chloranisidine (OCH3:NH2:Cl=1.2.4)
200  ccm. of water
 24  ccm. of hydrochloric acid 22° Bé.; mix well to a paste and cool
      with
150  gr. of ice, then add
  8  gr. of sodium nitrite, dissolved in
 50  ccm. of water
550  gr. of tragacanth 60 : 1000 and to this add before use
 20  gr. of sodium acetate
―――
1 kg.
```

(4.) The material is padded with a solution of:

```
23 gr. 2.3-hydroxynaphthoic acid-5-chloro-o-anisidide (NH.OCH3.
      Cl=1.2.5)
65 gr. caustic soda solution 22° Bé.
20 gr. sodium ricinolate
―――
made up to 1 litre.
```

It is then dried and printed with the following colour:

```
16,8 gr. 4-nitro-o-anisidine are dissolved with
 24  ccm. hydrochloric acid 22° Bé. and
200  ccm. boiling water, well cooled with
150  gr. ice. There are then added, while well stirring,
  8  gr. sodium nitrite, dissolved in
 50  gr. water and the whole is made up with water to
―――
500 grams.
```

This diazo solution is thickened with

```
480 gr. tragacanth 60 : 1000 to which are added before use
 20 gr. sodium acetate cryst.
―――
1 kg.
```

(5.) The material is padded with a solution of:

```
23 gr. 2.3-hydroxynaphthoic acid-5-chloro-o-anisidide (NH.OCH3.
      Cl=1.2.5)
60 gr. caustic soda solution 22° Bé., boiling water
20 gr. para soap P. N.
―――
made up to 1 litre.
```

It is then dried and printed with the following colour:

```
17,5 gr. 4-chloro-3-toluidine hydrochloride are dissolved in
200  ccm. water
 20  ccm. hydrochloric acid 22° Bé., then cool with
150  gr. ice, then add
  8  gr. sodium nitrite, dissolved in
 50  ccm. water, add while stirring
540  gr. tragacanth 60 : 1000 and add before use
 20  gr. sodium acetate
―――
1 kg.
```

(6.) The material is padded with a solution of:

```
27 gr. 2.3-hydroxynaphthoic acid-5-bromo-o-anisidide (NH.OCH3
      Br.=1.2.5)
60 gr. caustic soda solution 22° Bé.
20 gr. para soap P. N.
―――
made up to 1 litre
```

It is then dried and printed with the following colour:

```
15,7 gr. p-chloroanisidine (OCH3:NH2:Cl=1.2.4)
200  ccm. water
 24  ccm. hydrochloric acid 22° Bé., mix well to a paste cool with
150  gr. ice, then add
  8  gr. sodium nitrite, dissolved in
 50  ccm. water
550  gr. tragacanth 60 : 1000 and add before use
 20  gr. sodium acetate
―――
1 kg.
```

(7.) The material is padded with a solution of:

```
23 gr. 2.3-hydroxynaphthoic acid-5-chloro-o-anisidide (NH.OCH3.
      Cl=1.2.5)
65 gr. caustic soda solution 22° Bé.
20 gr. sodium ricinolate
―――
made up to 1 litre.
```

It is then dried and printed with the following colour:

```
15,7 gr. p-chloroanisidine (OCH3:NH2:Cl=1.2.4) are dissolved with
 24  ccm. hydrochloric acid 22° Bé. and
200  ccm. boiling water; cool well and add
150  gr. ice. Add while well stirring
  8  gr. sodium nitrite, dissolved in
 50  ccm. water and make up with water to
―――
500 gr.
```

This diazo solution is thickened with

```
480 gr. tragacanth 60 : 1000 and there are added before use
 20 gr. sodium acetate cryst.
―――
1 kg.
```

(8.) The material is padded with a solution of:

```
23 gr. 2.3-hydroxynaphthoic acid-5-chloro-o-anisidide (NH.OCH3.
      Cl=1.2.5)
65 gr. caustic soda solution 22° Bé.
20 gr. sodium ricinolate
―――
made up to 1 litre.
```

It is then dried and printed with the following colour:

```
17,5 gr. 4-chloro-2-toluidine or 3-chloro 4-toluidine are dissolved
      with
 24  ccm. hydrochloric acid 22° Bé. and
200  ccm. boiling water; cool well and add
150  gr. ice. Add while well stirring
  8  gr. sodium nitrite, dissolved in
 50  ccm. water and make up with water to
―――
500 gr.
```

This diazo solution is thickened with 480 gr. tragacanth 60 : 1000 and there are added before use
20 gr. sodium acetate cryst.
—
1 kg.

(9.) The diazo solution prepared in the usual way from 14, 1 gr. 4-chloro-o-toluidine is run, while stirring, into an aqueous suspension of 20 gr. of 2.3-hydroxynaphthoic acid-o-anisidide, made by dissolving it in caustic soda solution and re-precipitating with diluted acetic acid. The dyestuff separates in the form of red flakes. It is then filtered, washed and dried.

(10.) The material is padded with a solution of:

26 gr. 2.3-hydroxynaphthoic acid-5-chloro-2-phenetidide (NH : OC$_2$H$_5$: Cl=1.2.5)
20 gr. para soap P. N.
70 ccm. caustic soda solution 22° Bé.
—
made up to 1 litre.

It is then dried with the following colour:

17, 5 gr. 2.5-dichloro-4-toluidine are well mixed to a paste with
200 ccm. water and
24 ccm. hydrochloric acid 22° Bé.; then cool with
150 gr. ice and add
8 gr. sodium nitrite, dissolved in
50 ccm. water.

This diazo solution is thickened with:

530 gr. tragacanth 60 : 1000 and add before the use of the printing colour
20 gr. sodium acetate
—
1 kg.

(11.) The material is padded with a solution of:

23 gr. 2.3-hydroxynaphthoic acid-5-chloro-2-anisidide (NH : OCH$_3$: Cl=1.2.5)
20 gr. para soap P. N.
65 ccm. caustic soda solution 22° Bé.
—
made up to 1 litre.

It is then dried and printed with the following colour:

19, 1 gr. 2.5-dichloro-4-aminoanisol are well mixed to a paste with
200 ccm. water and
24 ccm. hydrochloric acid 22° Bé.; then cool with
150 gr. ice and add
8 gr. sodium nitrite, dissolved in
50 ccm. water.

This diazo solution is thickened with 530 gr. tragacanth 60 : 1000 and there are added before using the printed colour
20 gr. sodium acetate
—
1 kg.

(12.) The material is padded with a solution of:

24, 9 gr. 2.3-hydroxynaphthoic acid-5-chloro-2-anisidide (NH.OCH$_3$ Cl=1.2.5)
80 ccm. caustic soda solution 22° Bé.
20 gr. para soap P. N.
—
made up to 1 litre.

It is then dried and printed with the following colour:

10 gr. p-diaminodiphenylamine
200 ccm. hot water and
24 ccm. hydrochloric acid 22° Bé.; mix well to a paste, cool and add
150 gr. ice, then add
8 gr. sodium nitrite dissolved in
50 ccm. water, pour, while stirring, into
538 gr. tragacanth 60 : 1000 and add before use
20 gr. sodium acetate
—
1 kg.

(13.) The material is padded with the preparation indicated in Example 12 and printed with the following colour:

17, 2 gr. 2.2'-dichlorbenzidine hydrochloride are made into a paste with
150 gr. water and
20 ccm. hydrochloric acid 22° Bé.; cool and add
150 gr. ice. Add, while stirring,
3 gr. sodium nitrite dissolved in
50 ccm. water and make up to
—
500 gr.

This diazo solution is thickened with:

480 gr. tragacanth 60 : 1000 to which are added before use
20 gr. sodium acetate cryst.
—
1 kg.

(14.) The yarn is impregnated with the following preparation:

12, 45 gr. 2.3-hydroxynaphthoic acid-5-chloro-2-anisidide (NH.OCH$_3$. Cl=1.2.5)
27 ccm. caustic soda solution 34° Bé.
30 ccm. sodium Turkey red oil 50%
500 ccm. hot water: make up with cold water to
—
1 litre The impregnated yarn is wrung out and dyed with the following diazo solution:

2, 82 gr. alpha-naphthylamine base are made to a paste with
4, 4 ccm. hydrochloric acid 22° Bé. and with
50 ccm. water, cooled by adding
25 gr. ice; add while stirring a solution of
1, 5 gr. sodium nitrite in
30 ccm. water and make up with cold water to
—
1 litre. Add before use 4 gr. sodium acetate.

After dyeing the material is well washed and soaped.

(15.) The hereafter described diazo solution is added slowly, while stirring, to the solution of the sodium salt of 2.3-hydroxynaphthoic acid-5-chloro-2-anisidide mixed with barytes; after the lake has been allowed to deposit, it is, as usual, repeatedly decanted with clean water, filtered off and dried.

*Diazo solution.*

1, 78 gr. 4-chloro-1-naphthylamine base are dissolved with
200 ccm. hot water and
2, 4 ccm. hydrochloric acid 22° Bé. then cooled with
600 gr. cold water and
100 gr. ice, whereupon are added
0, 8 gr. sodium nitrite dissolved in
16 ccm. water and further added before use
2 gr. sodium acetate and made up to
—
1 litre The whole is then, as above indicated, poured, while stirring, into:

3, 27 gr. 2.3-hydroxynaphthoic acid-5-chloro-2-anisidide (NH.OCH$_3$. Cl=1.2.5)
10, 5 ccm. caustic soda solution 22° Bé. and
124 gr. barytes
—
made up to 1 litre

Having now described my invention, what I claim is:

1. As new products, the azo dyestuffs of the general formula:

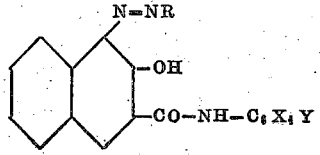

wherein R stands for any residue, X for hydrogen, halogen or any substituent, Y for an alkyloxy, aryloxy or aralkyloxy group in ortho position to the nitrogen.

2. As new products, the azo dyestuffs, which can be obtained by combining any diazo compounds with the 2.3-hydroxy-naphthoic acid-anilide of the formula:

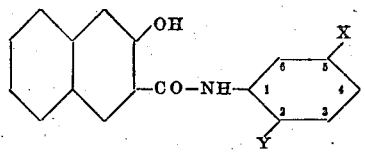

wherein X stands for halogen and Y for an alkyloxy, aryloxy or aralkyloxy group.

In testimony whereof, I affix my signature.

DR. HERMANN WAGNER.